(12) United States Patent
Brown et al.

(10) Patent No.: US 7,725,711 B2
(45) Date of Patent: May 25, 2010

(54) SYSTEM AND METHOD OF ACCESSING KEYS FOR SECURE MESSAGING

(75) Inventors: Michael K. Brown, Peterborough (CA); Michael S. Brown, Waterloo (CA); Herbert A. Little, Waterloo (CA); Neil P. Adams, Waterloo (CA)

(73) Assignee: Research in Motion Limited, Waterloo (CA)

( * ) Notice: Subject to any disclaimer, the term of this patent is extended or adjusted under 35 U.S.C. 154(b) by 1234 days.

(21) Appl. No.: 10/817,070

(22) Filed: Apr. 2, 2004

(65) Prior Publication Data
US 2005/0038991 A1 Feb. 17, 2005

Related U.S. Application Data

(60) Provisional application No. 60/494,369, filed on Aug. 12, 2003.

(51) Int. Cl.
H04L 29/06 (2006.01)
(52) U.S. Cl. .......................... 713/158; 713/175; 705/76
(58) Field of Classification Search ........................ None
See application file for complete search history.

(56) References Cited

U.S. PATENT DOCUMENTS

| | | | | |
|---|---|---|---|---|
| 5,774,552 | A * | 6/1998 | Grimmer | 713/156 |
| 6,438,690 | B1 * | 8/2002 | Patel et al. | 713/156 |
| 6,684,248 | B1 * | 1/2004 | Janacek et al. | 709/225 |
| 6,782,266 | B2 * | 8/2004 | Baer et al. | 455/456.4 |
| 2002/0169954 | A1 * | 11/2002 | Bandini et al. | 713/153 |
| 2003/0079125 | A1 * | 4/2003 | Hope et al. | 713/156 |
| 2003/0169954 | A1 * | 9/2003 | Lenick et al. | 384/537 |
| 2004/0168055 | A1 * | 8/2004 | Lord et al. | 713/156 |

OTHER PUBLICATIONS

International Search Report and the Written Opinion of the International Searching Authority, or the Declaration of Application No. PCT/CA2004/000509 of Apr. 2, 2004—14pgs.
"PGP Freeware for Windows 95, Windows 98, Windows NT, Windows 2000 & Windows Millennium User's Guide, Version 7.0" Internet, 'Online! Jan. 2001, pp. 1-246, XP002286313.
Brown M. et al: "PGP in Constrained Wireless Devices" Proceedings of the Usenix Security Symposium, Aug. 14, 2000, pp. 247-261, XP002210575.
"WinPT Documentation" Internet, 'Online!, Apr. 15, 2003, the whole document, XP002286314.
Ashley M. et al.: "The GNU Privacy Handbook" Internet, 'Online! 1999, the whole document, XP002286316.
Scribner D. et al: "GNUPG Frequently Asked Questions" Internet, 'Online!, Jun. 30, 2003, the whole document, XP002286317.
Crispo B. et al: "WWW Security and Trusted Third Party Services", Future Generations Computer Systems, Elsevier Science Publishers. Amsterdam, NL, vol. 16, No. 4, Feb. 2000, pp. 331-341, XP004185845.
Klobucar T. et al: "Certificate policies formalisation and comparison" Computer Standards and Interfaces, Elsevier Sequoia. Lausanne, CH, vol. 21, No. 3, Aug. 1, 1999, pp. 299-307, XP004183122.

* cited by examiner

*Primary Examiner*—Gilberto Barron, Jr.
*Assistant Examiner*—Simon Kanaan
(74) *Attorney, Agent, or Firm*—Jones Day; Krishna K. Pathiyal; Robert C. Liang

(57) ABSTRACT

Methods and systems for handling on an electronic device a secure message to be sent to a recipient. Data is accessed about a security key associated with the recipient. The received data is used to perform a validity check related to sending a secure message to the recipient. The validity check may uncover an issue that exists with sending a secure message to the recipient. A reason is determined for the validity check issue and is provided to the mobile device's user.

45 Claims, 7 Drawing Sheets

SYSTEM AND METHOD OF ACCESSING KEYS FOR SECURE MESSAGING

CROSS-REFERENCE TO RELATED APPLICATION

This application claims priority to and the benefit of U.S. provisional application Ser. No. 60/494,369 (entitled "PUBLIC KEY ACCESS SCHEME FOR SECURE COMMUNICATIONS" filed Aug. 12, 2003). By this reference, the full disclosure, including the drawings, of U.S. provisional application Ser. No. 60/494,369, is incorporated herein by reference.

BACKGROUND

1. Technical Field

The present invention relates generally to the field of secure electronic messaging, and in particular to accessing keys for secure messaging.

2. Description of the Related Art

Known secure messaging software clients, such as e-mail software applications operating on desktop computer systems, provide limited information when an error is encountered in accessing a key (e.g., a public key) required for secure communications. Typically, only an indication that an error occurred is provided, without information on the nature of the error or possible corrective actions. Also, when such an error occurs, a user is often prevented from sending the message.

SUMMARY

In accordance with the teachings disclosed herein, methods and systems are provided for handling on an electronic device a secure message to be sent to a recipient. Data is accessed about a security key that is associated with the recipient. The data is used to perform a validity check related to sending a secure message to the recipient. The validity check may uncover an issue related to sending a secure message to the recipient. A reason is determined for the validity check issue and is provided to the electronic device's user.

As an example of a method to handle secure messages, a method may include receiving data about a security key associated with the recipient. The received data is used to perform a validity check with respect to using the message recipient's security key to send a secure message to the recipient. An issue may be determined to exist based upon the validity check. A reason for the issued is also determined and provided to the electronic device's user.

As an example of a system to handle secure messages, a system may include a secure message processing module for use with a messaging client to send electronic messages to recipients. The secure message processing module receives data about a security key associated with the recipient. The secure message processing module uses the received data to perform a validity check with respect to using the message recipient's security key to send a secure message to the recipient. An issue may exist based upon the validity check and a reason is determined for the validity check issue. The secure message processing module provides the reason of the validity check issue to the electronic device's user.

DETAILED DESCRIPTION

Approaches disclosed herein for handling secure messages on mobile devices may be used with many different types of security schemes and messaging systems. As an example, in a public key cryptography scheme, each user has a key pair including a public key that is distributed or available to other users and a private key that is known only to the user that is the "owner" of the key pair. For secure messaging operations based on public key cryptography, a user uses a private key to decrypt received encrypted messages and to sign messages to be sent. Public keys are used to encrypt messages to be sent and to verify digital signatures on received messages. Thus, access to public keys of other users is required for different secure messaging operations.

Secure messages may be signed with a digital signature, encrypted, or both signed and encrypted, and may also be processed in other ways by a message sender or intermediate system between a message sender and a messaging client which receives the secure message. For example, secure messages include messages that have been signed, encrypted and then signed, or signed and then encrypted, by a message sender according to variants of Secure Multipurpose Internet Mail Extensions (S/MIME). A secure message could similarly be encoded, compressed or otherwise processed either before or after being signed and/or encrypted.

A messaging client allows a system on which it operates to receive and possibly also send messages. Messaging clients operate on a computer system, a handheld device, or any other system or device with communications capabilities. Many messaging clients also have additional non-messaging functions.

Figure 1:
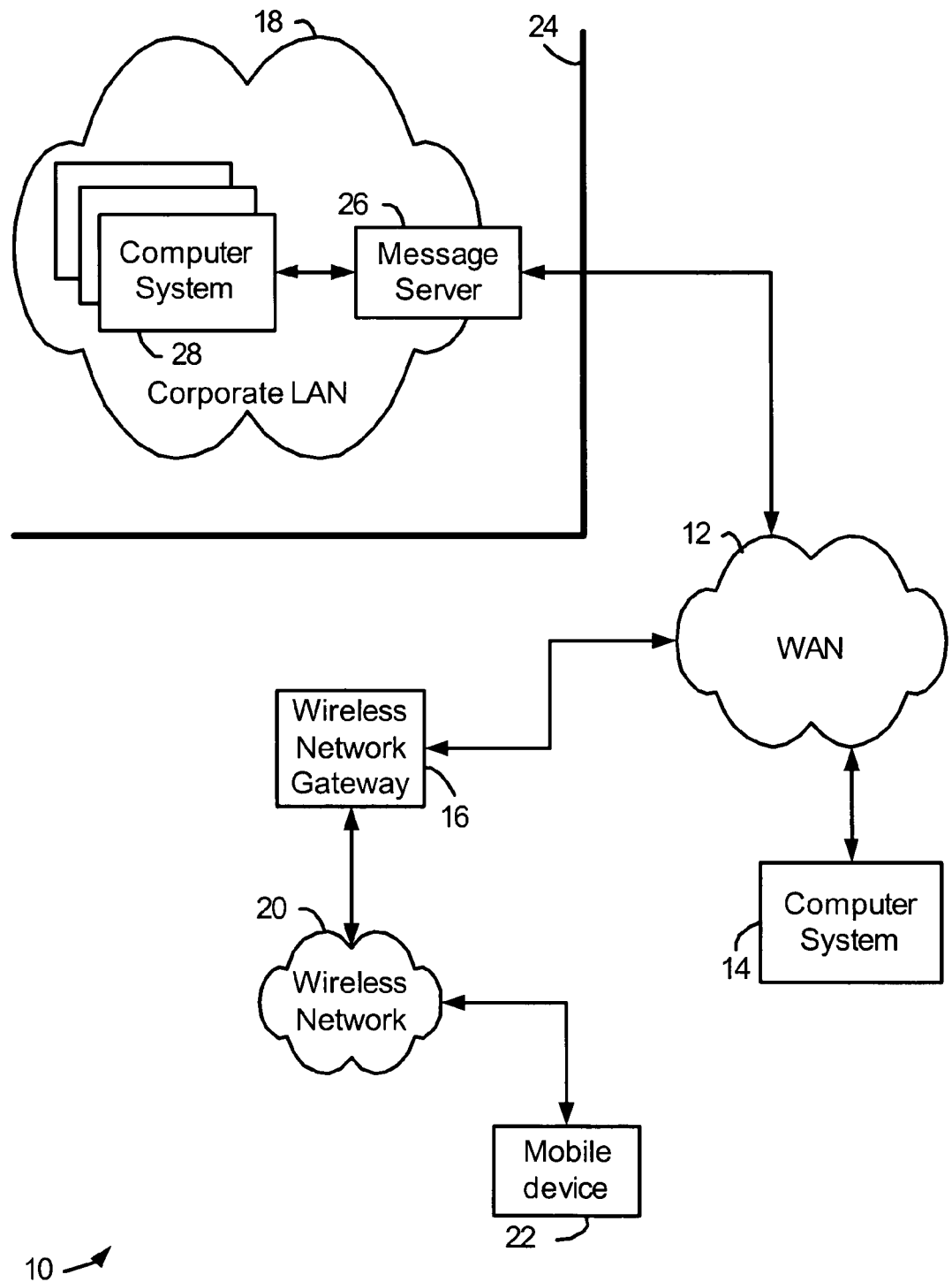
FIG. 1 is a block diagram of a messaging system.

FIG. 1 is a block diagram of a messaging system. The system 10 includes a Wide Area Network (WAN) 12, coupled to a computer system 14, a wireless network gateway 16, and a Local Area Network (LAN) 18 (e.g., a corporate LAN). The wireless network gateway 16 is also coupled to a wireless communication network 20, in which a wireless mobile communication device 22 ("mobile device") is configured to operate.

The computer system 14 is a desktop or laptop personal computer (PC), which is configured to communicate to the WAN 12, which is the Internet in most implementations. PCs, such as computer system 14, normally access the Internet through an Internet Service Provider (ISP), an Application Service Provider (ASP), or the like.

The corporate LAN 18 is a network-based messaging client. It is normally located behind a security firewall 24. Within the corporate LAN 18, a message server 26, operating on a computer behind the firewall 24, serves as the primary interface for the corporation to exchange messages both within the LAN 18, and with other external messaging clients via the WAN 12. Two known message servers 26 are Microsoft™ Exchange server and Lotus Domino™ server. These servers 26 are often used in conjunction with Internet mail routers that route and deliver mail messages. A server such as the message server 26 also typically provides additional functionality, such as dynamic database storage for calendars, to do lists, task lists, e-mail, electronic documentation, etc.

The message server 26 provides messaging capabilities to the corporation's networked computer systems 28 coupled to the LAN 18. A typical LAN 18 includes multiple computer systems 28, each of which implements a messaging client, such as Microsoft Outlook™, Lotus Notes, etc. Within the LAN 18, messages are received by the message server 26, distributed to the appropriate mailboxes for user accounts addressed in the received message, and then accessed by a user through a computer system 28 operating as a messaging client.

The wireless gateway 16 provides an interface to a wireless network 20, through which messages are exchanged with a mobile device 22. Such functions as addressing of the mobile device 22, encoding or otherwise transforming messages for wireless transmission, and any other required interface functions are performed by the wireless gateway 16. Although the wireless gateway 16 operates with the single wireless network 20 in FIG. 1, wireless gateways may be configured to operate with more than one wireless network in alternative embodiments, in which case the wireless gateway may also determine a most likely network for locating a given mobile device user and may also track users as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers, could be implemented to provide a private interface to a wireless network. For example, a wireless VPN router implemented in the LAN 18 would provide a private interface from the LAN 18 to one or more mobile devices such as the mobile device 22 through the wireless network 20. Wireless VPN routers and other types of private interfaces to the mobile device 22 may effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to a user of a mobile device 22 are sent through the wireless network interface, either a wireless VPN router, wireless gateway 16 or other interface, to the wireless network 20 and to the user's mobile device 22. Another alternate interface to a user's mailbox on a message server 26 is a Wireless Application Protocol (WAP) gateway, through which a list of messages in a user's mailbox on the message server 26, and possibly each message or a portion of each message, could be sent to the mobile device 22.

Wireless networks such as the wireless network 20 normally deliver information to and from mobile devices via RF transmissions between base stations and the mobile devices. The wireless network 20 may, for example, be a data-centric wireless network, a voice-centric wireless network, or a dual-mode network that can support both voice and data communications over the same infrastructure. Known data-centric network include the Mobitex™ Radio Network ("Mobitex"), and the DataTAC™ Radio Network ("DataTAC"). Examples of known voice-centric data networks include Personal Communication Systems (PCS) networks like Global System for Mobile Communications (GSM) and Time Division Multiple Access (TDMA) systems. Dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS), which are currently under development.

The mobile device 22 is a data communication device, a voice communication device, or a multiple-mode device capable of voice, data and other types of communications. An exemplary mobile device 22 is described in further detail below.

Perhaps the most common type of messaging currently in use is e-mail. In a standard e-mail system, an e-mail message is sent by an e-mail sender, possibly through a message server and/or a service provider system, and is then routed through the Internet, when necessary, to one or more message receivers. E-mail messages are normally sent in the clear and typically use Simple Mail Transfer Protocol (SMTP) headers and Multi-purpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to protect data content, and signing, which protects the integrity of a message and provides for sender authentication by a message receiver. In addition to utilizing digital signatures and possibly encryption, secure messages may also be encoded, compressed or otherwise processed.

Figure 2:
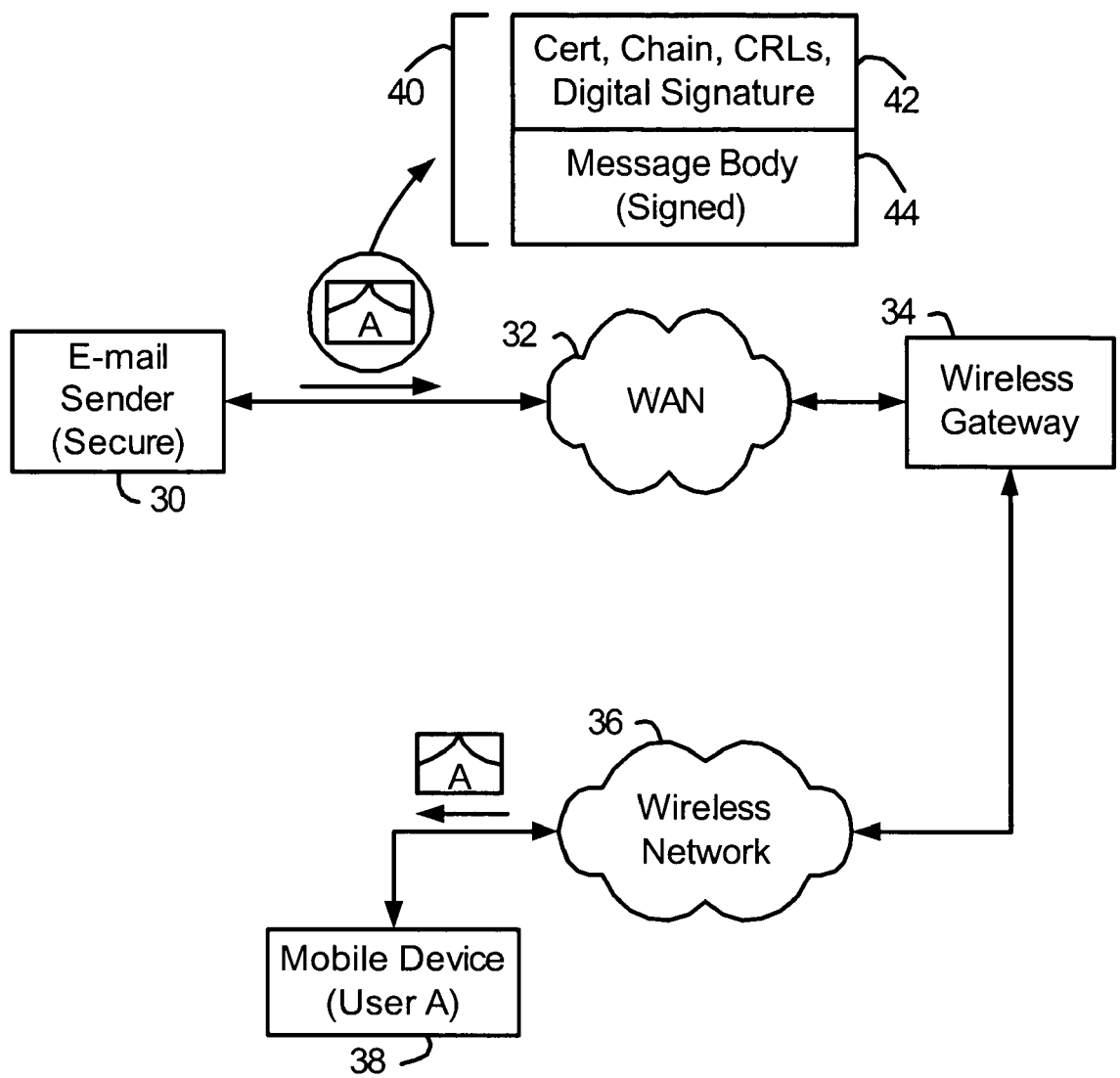
FIG. 2 is a block diagram illustrating a secure e-mail message exchange in a messaging system.

FIG. 2 is a block diagram illustrating a secure e-mail message exchange in a messaging system. The system includes an e-mail sender 30 coupled to a WAN 32, and a wireless gateway 34, which provides an interface between the WAN 32 and a wireless network 36. A mobile device 38 is adapted to operate within the wireless network 36.

The e-mail sender 30 is a PC, such as the system 14 in FIG. 1, a network-connected computer, such as computer 28 in FIG. 1, or a mobile device, on which a messaging client operates to enable e-mail messages to be composed and sent. The WAN 32, wireless gateway 34, wireless network 36 and mobile device 38 are substantially the same as similarly-labelled components in FIG. 1.

In an example digital signature scheme, a secure e-mail message sender 30 digitally signs a message by taking a digest of the message and signing the digest using the sender's private key. A digest may, for example, be generated by performing a check-sum, a Cyclic Redundancy Check (CRC), a hash, or some other non-reversible operation on the message. This digest is then digitally signed by the sender using the sender's private key. The private key is used to perform an encryption or some other transformation operation on the digest to generate a digest signature. A digital signature, including the digest and the digest signature, is then appended to the outgoing message. In addition, a digital Certificate (Cert) of the sender, which includes the sender's public key and sender identity information that is bound to the public key with one or more digital signatures, and possibly any chained Certs and Certificate Revocation Lists (CRLs) associated with the Cert and any chained Certs, is often included with the outgoing message.

The secure e-mail message 40 sent by the e-mail sender 30 includes a component 42 including the sender's Cert, Cert chain, CRLs and digital signature and the signed message body 44. In the S/MIME secure messaging technique, Certs, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message 40 may include addressing information, such as "To:" and "From:" email addresses, and other header information not shown in FIG. 2.

When the secure e-mail message 40 is sent from the e-mail sender 30, it is routed through the WAN 32 to the wireless gateway 34, through the wireless network 36, and then to the mobile device 38. As described above, an e-mail message sender may alternatively send a message directly to a wireless gateway, to a computer system associated with a mobile device, or to a wireless VPN router or other interface for delivery to a mobile device.

The receiver of the signed message 40, the mobile device 38, typically verifies the digital signature 42 in the secure message 40 by generating a digest of the message body 44, extracting the transmitted digest from the digital signature 42, comparing the generated digest with the digest extracted from the digital signature 42, and then verifying the digest signature in the digital signature. The digest algorithm used by a secure message receiver to generate the generated digest is the same as the algorithm used by the message sender, and is normally specified in a message header, or possibly in a digital signature of the secure message. Commonly used digest algorithm include the Secure Hash Algorithm 1 (SHA1) and Message-Digest Algorithm 5 (MD5), although other digest algorithms may be used.

It should be appreciated that the systems and methods described herein are in no way limited to the above, or any other digital signature scheme. The systems and methods described herein are substantially independent of the manner in which a key is to be used.

In order to verify the digest signature, the receiver 38 retrieves the public key of the sender 30, generally by extracting the public key from the sender's Cert 42 attached to the message 40, and then verifies the signature on the digest in the digital signature by performing a reverse transformation on the digest signature. For example, if the message sender 30 generated the digest signature by encrypting the digest using its private key, then a receiver 38 uses the sender's public key to decrypt the digest signature to recover the original digest. The secure message 40 shown in FIG. 2 includes the sender's Cert 42, from which the sender's public key can be extracted. Where the sender's public key was extracted from an earlier message from the sender 30 and stored in a key store in the receiver's local store, the sender's public key may instead be retrieved from the local store. Alternatively, the public key may be retrieved from the sender's Cert stored in a local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, Internet or other network or system through which message receivers may establish communications with the PKS.

The Cert, Cert chain and CRLs 42 are used by a receiver to ensure that the sender's Cert is valid, i.e., that the Cert has not been revoked or expired, and is trusted. A Cert is often part of a Cert chain, which includes a user's Cert as well as other Certs to verify that the user's Cert is authentic. For example, a Cert for any particular entity typically includes the entity's public key and identification information that is bound to the public key with a digital signature. Several types of Cert currently in use include, for example, X.509 Certs, which are typically used in S/MIME, and PGP Certs, which have a slightly different format. The digital signature in a Cert is generated by the issuer of the Cert, and is checked by a message receiver as described above. A Cert may include an expiry time or validity period from which a messaging client determines if the Cert has expired. When a CRL is available, the Cert is checked against the CRL to ensure that the Cert has not been revoked.

If the digital signature in a message sender's Cert is verified, the Cert has not expired or been revoked, and the issuer of the Cert is trusted by a message receiver, then the digital signature of the message is trusted by the message receiver. If the issuer of the Cert is not trusted, then the message receiver traces a certification path through the Cert chain to verify that each Cert in the chain was signed by its issuer, whose Cert is next in the Cert chain, until a Cert is found that was signed by a root Cert from a trusted source, such as a large PKS. Once a root Cert is found, then a signature can be trusted, because both the sender and receiver trust the source of the root Cert.

If a secure message was encrypted or otherwise processed by a message sender after being signed, then each receiver first decrypts or performs other inverse processing operations on the message before signature verification is performed. Where encryption or other processing was performed before signing, however, inverse processing such as decryption is performed after signature verification. Encryption and decryption involve applying a cryptographic key and cipher algorithm to information to be encrypted or decrypted. Encryption and decryption use corresponding cipher algorithms, which may or may not be the same, and either the same or different cryptographic keys. In public key systems, different keys are used for encryption and decryption, whereas in "shared secret" type operations, the same key, a secret shared between a sender and recipient, is used for both encryption and decryption.

Access to a users public key is also required when an outgoing message addressed to that user is to be encrypted according to a public key encryption algorithm. However, when an error is encountered during a public key access operation, known messaging clients provide little or no information as to the nature of any errors and possible solutions.

Figure 3:
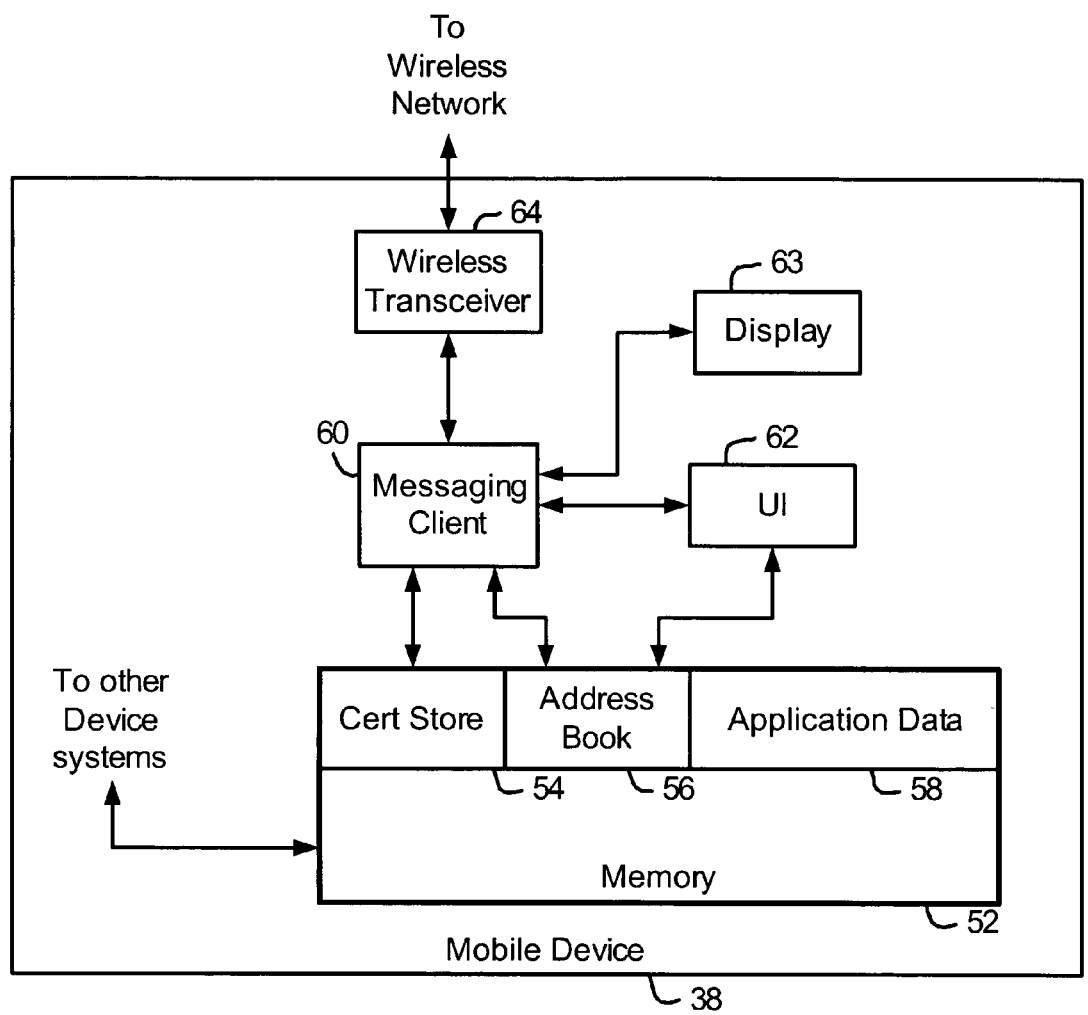
FIG. 3 is a block diagram of a wireless mobile communication device implementing a public key access scheme.

FIG. 3 is a block diagram of a wireless mobile communication device implementing a public key access scheme. The mobile device 38 includes a memory 52, a messaging client 60, a user interface (UI) 62, a display 63, and a wireless transceiver 64.

The memory 52 is a writeable store such as a RAM into which other device components and systems write data, and includes a storage area for a Cert store 54, an address book 56 in which messaging contact information is stored, and an application data storage area 58 which stores data associated with software applications on the mobile device 38. Data stores 54, 56, and 58 are illustrative examples of stores that may be implemented in a memory 52 on mobile device 38. The memory 52 is also typically used by other device systems in addition to those shown in FIG. 3 to store other types of data.

The messaging system 60 is connected to the wireless transceiver 64 and is thus enabled for communications via a wireless network.

The UI 62 may include such UI components as a keyboard or keypad, or other components which accept inputs from or provide outputs to a user of the mobile device 38. A mobile device 38 will typically include more than one UI, and the UI 62 therefore represents one or more user interfaces.

In the mobile device 38, the display 63 is typically a liquid crystal display (LCD), although other types of display may instead be used in mobile devices. The display 63 is also a user interface, but is shown separately in FIG. 3.

The messaging client 60 stores received Certs to the Cert store 54 and retrieves stored Certs from the Cert store 54.

Certs are normally stored in the Cert store 54 in the format in which they are received, but may alternatively be parsed or otherwise translated into a storage format before being written to the Cert store 54. Certs may be received with secure messages, requested from a Cert source such as a PKS via the wireless transceiver 64, or loaded onto the mobile device 38 through a communications interface such as a serial port, Universal Serial Bus (USB) port, Infrared Data Association (IrDA) port, or Bluetooth™ module, from a similarly equipped external system, a PC for example. As described above, a public key in a Cert may be required for sending or receiving secure messages. Those skilled in the art will appreciate that a mobile device enabled for secure communications may include a separate key store for storing cryptographic keys, instead of or in addition to a Cert store 54.

As described above, known messaging clients do not handle public key access problems well, typically indicating only that such a problem has occurred, thus leaving a user uninformed about the nature of the problem and/or any steps that could be taken to resolve the problem.

To address this and other aspects, the messaging client 60 may determine whether any problems with public key access have been encountered when a message is to be sent, and if so, what the problems are. The user is then allowed to attempt to resolve these problems before sending the message.

When a user composes an outgoing message and chooses to encrypt the message using each recipient's public key, using S/MIME, PGP or another secure messaging scheme, the messaging client 60 makes a list of all of the recipients for the outgoing message and collates all of the corresponding Certs, and then performs a series of checks on the Certs. Certs represent one possible format or mechanism for accessing public keys, and that the system in this example is in no way limited to Cert-based public key access.

A determination is made as to whether a Cert for each recipient is locally available to the messaging client 60, by searching the Cert store 54, for example. If it is not available, the messaging client 60 may invoke an LDAP (Lightweight Directory Access Protocol) or other type of search to find a Cert for the recipient. If a Cert is found, then the messaging client 60 can check the Cert. If no Cert is found, however, the user is preferably given the option to remove the recipient from the send list or to cancel the send operation for the composed message. The messaging client 60 may also check to see if the user is allowed to use each Cert for the purpose of encryption. This is determined, for example, based on a "Usage" field for the Cert (e.g., it may only be allowed to be used for signing, thereby prohibiting the mobile device from using it for encryption purpose; etc.) or a control file installed on the device 38 that specifies which Certs the user is allowed to use.

The messaging client 60 then preferably checks the "strength" of the certificate, defined by the size of the public key in the Cert, which is compared to a predefined setting stored at the mobile device 38, such as in the above-mentioned control file. If the Cert, or the public key in particular, is not "strong" enough, then the user can either remove the recipient or cancel the operation. Where a control file has been installed on the mobile device 38, this option can be prevented by a setting that disallows Certs from being used that have been designated as "weak" by the control file.

A trust check, described above, may also be performed by the messaging client 60. If the Cert is trusted, then it is used. Otherwise the user is asked if they wish to proceed, such as by removing the recipient from the message or cancelling the operation. Where a control file has been installed on the mobile device 38, this option can be prevented by a setting that disallows untrusted Certs from being used.

Validity and revocation status of each Cert may also be determined. If the Cert validity dates have passed or the Cert has been revoked, then the user is alerted and asked if they wish to proceed. As described above for untrusted Certs, a control file or control settings on the mobile device 38 may be used to prevent a user from using invalid or revoked Certs. Thus, if any public key access problems occur, the user is alerted with what the problem is and how to resolve it.

Figure 4A:
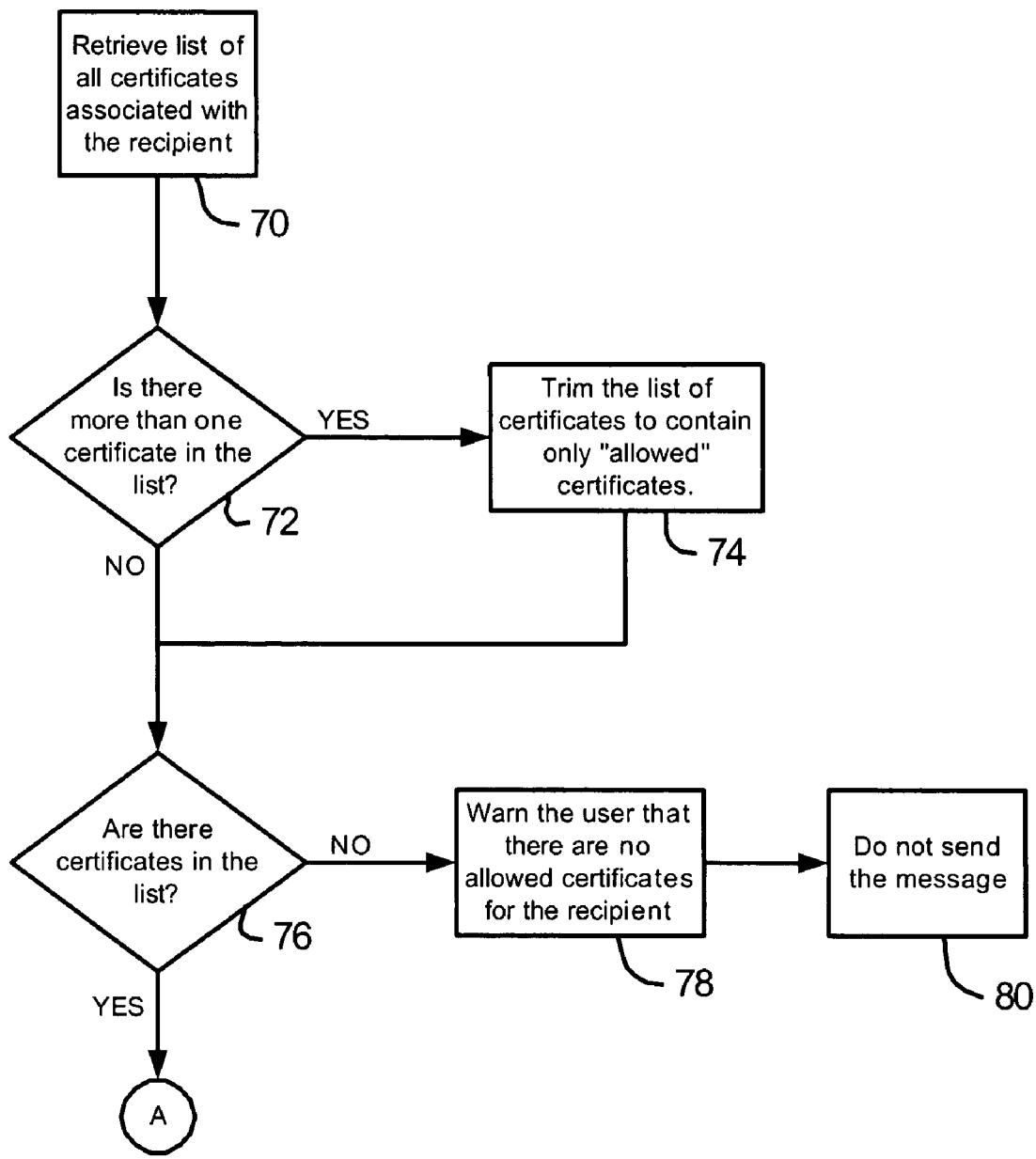
FIGS. 4A-4C are flow charts illustrating a method of accessing public keys.
Figure 4B:
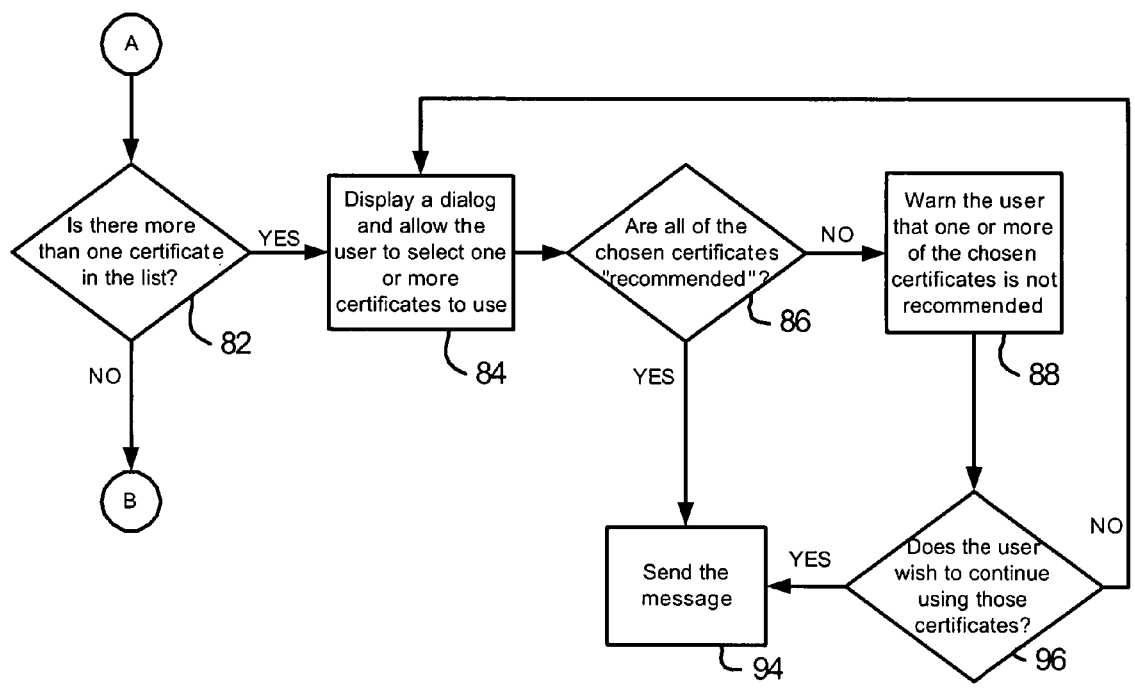
Figure 4C:
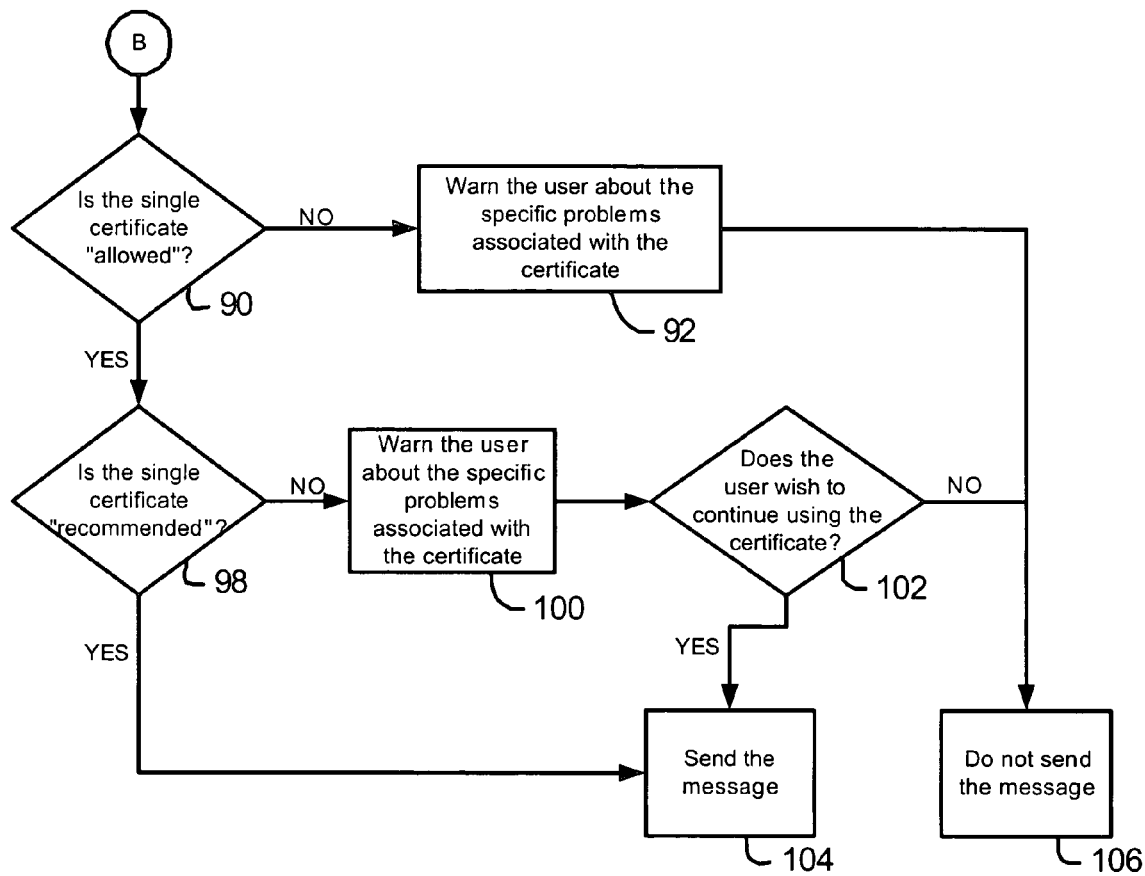

FIGS. 4A-4C illustrate an operational scenario example wherein a composed message is to be encrypted using a secure email encoding and sent. In order to encrypt the email for a particular recipient, an email system or software application obtains access to the public key associated with that recipient. Although this example describes the situation wherein the public key is contained in a digital certificate, it should be understood that depending on the particular secure email encoding that is being used, this public key may be contained inside a Cert or inside some other key container, and can be independent of the type of key container used by the secure email encoding. For example, although PGP keys have many of the same properties as Certs, they are not usually referred to as Certs.

In step 70, a list of all Certs associated with one intended recipient of the composed message is compiled. This list of Certs may be compiled by searching through a database of Certs stored in or accessed by the email system, for example. In step 72, it is determined whether more than one Cert has been found for the recipient. If so, the list is trimmed in step 74 to include only those Certs that are "allowed" in the user's operating environment.

The determination of whether a Cert is allowed can be made in a number of ways. As an illustration, an IT or security administrator has the ability to send a set of certificate policies to the email system. These certificate policies can include a number of properties that certificates must have in order to be considered "allowed". By way of example, a certificate policy could specify that a certificate is allowed only if it has not expired, meaning that a user should not be permitted to use an expired certificate. Other examples of certificate policies could specify that a certificate is allowed only if it has not been revoked, if it is trusted (where the notion of trust is determined according to the model implied by the particular secure email encoding and type of key container), and/or if it contains a strong public key (where the notion of strength is determined by limits appropriate to current technology, or preferably by a set of key strength policies set by the administrator). There are many other certificate policies that could be set by the administrator, or potentially by a user.

In step 76, it is determined whether there are any Certs remaining in the list of Certs for the recipient. If not, then the user is warned that there are no available allowed Certs, at step 78. The warning presented to the user may give the user several different options. For example, the user may be able to remove the recipient from the list of intended recipients of the message, the user may be able to open a Cert search application, such as an LDAP browser, in order to fetch Certs for the recipient, the user may be able to manually select Certs to use for the recipient from a list of all allowed Certs in the system, or the user may be able to send the message without encryption, thereby removing the need to obtain the recipient's Cert. Other options may be used. If the message send operation is aborted, then the message is not sent, as shown at 80.

In step 82, it is determined whether there is still more than one Cert in the list of Certs for the recipient. If this is the case, then all of the Certs in the list are allowed in the user's operating environment, because the list was trimmed in step 74. At this point, a dialog is displayed at step 84 which asks the user to select one or more Certs to use from the list of available Certs. After the user has selected a set of Certs, it is determined at step 86 whether all of the selected Certs are recommended. The determination of whether a Cert is recommended can be made in a number of ways. As an illustration, a Cert is recommended if it has not been revoked, if it is trusted, if it has not expired, and/or if it contains a strong public key, although there are other criteria that could be considered. It should be noted that a Cert that is not recommended may still be allowed, such as depending on the set of certificate policies set by the administrator.

If one or more of the selected certificates is not recommended, then in step 88 the user is warned. If the user chooses to continue at step 96, then the message is encrypted to the recipient using the public keys found in that set of Certs and sent at step 94. If the user chooses not to continue, processing returns to the dialog at step 84 and the user is asked to revise the Cert selection.

If the method reaches step 90, then there was exactly one Cert found for the recipient. If that single Cert is not allowed in the user's operating environment, then the user will be warned at step 92. This warning preferably contains a specific description of the reason or reasons that the Cert was not allowed. It is to be understood that the information about this warning could be saved in a temporary location until all of the recipients of the message have been processed, at which point a set of combined warnings for all of the intended recipients could be displayed. This warning, like the warning in step 78, presents the user with a similar set of options to allow the user to recover from this situation.

If the single certificate is allowed, in step 98 it is determined whether the Cert is recommended. If it is not recommended, the user will be warned at step 100. Again, this warning preferably contains a specific description of the reason or reasons that the certificate was not recommended. As above, the information about this warning could be saved in a temporary location until all of the recipients of the message have been processed, at which point a set of combined warnings for all of the intended recipients could be displayed. This warning, like the previously described warnings, presents the user with a similar set of options to allow the user to recover from this situation. In addition, the user is allowed to continue using the Cert at step 102, since in this case even though the certificate is not recommended for use, it is allowed. The message is then either encrypted and sent at step 104 or not sent, as indicated at 106.

The message is also encrypted and sent at step 104 if it is determined at step 98 that the single Cert is recommended. The steps shown in FIGS. 4A-4C may be repeated for each intended recipient of a composed message before sending the message.

FIGS. 4A-4C show an operational scenario of a public key access method. It should be apparent that operations and methods described herein may include further, fewer or different steps than those shown in FIGS. 4A-4C. For example, a method need not perform every check shown in FIGS. 4A-4C, and checks may be performed in a different order than shown in FIGS. 4A-4C. As another example, if a user is warned that a Cert is not available (such as at step 78, step 92, or step 100), then the user can be presented with an option to use LDAP services to locate another Cert for a recipient.

In addition, instructions (e.g., software-based, firmware-based, etc.) that can operate on a mobile device's processor may implement the operations disclosed herein. The instructions may be implemented as a secure message processing module, which may have one or more modules to retrieve the data needed to perform the checking as well as one or more modules to perform the checks and to act based upon the results of the checking. The instructions may be separate to or a part of the messaging client 60 and utilize data structures as part of its operations, such as to store results from the checking-related operations. Among other things, the instructions provide information on the nature of the error and/or possible corrective actions. Also, when an error occurs, a user may still be allowed to send the message, such as by allowing the user to proceed after be appraised of the warnings associated with a recipient. Still further, data signals transmitted via a communication channel may be used with the systems and methods. The data signals can include any type of data or voice information, such as an encoded message transmitted to and/or from a mobile device. The data signal may be packetized data that is transmitted through a carrier wave or other medium across the network. Still further computer-readable media may be provided to and used with the mobile device for causing a mobile device to perform the methods and implement the systems disclosed herein.

Figure 5:
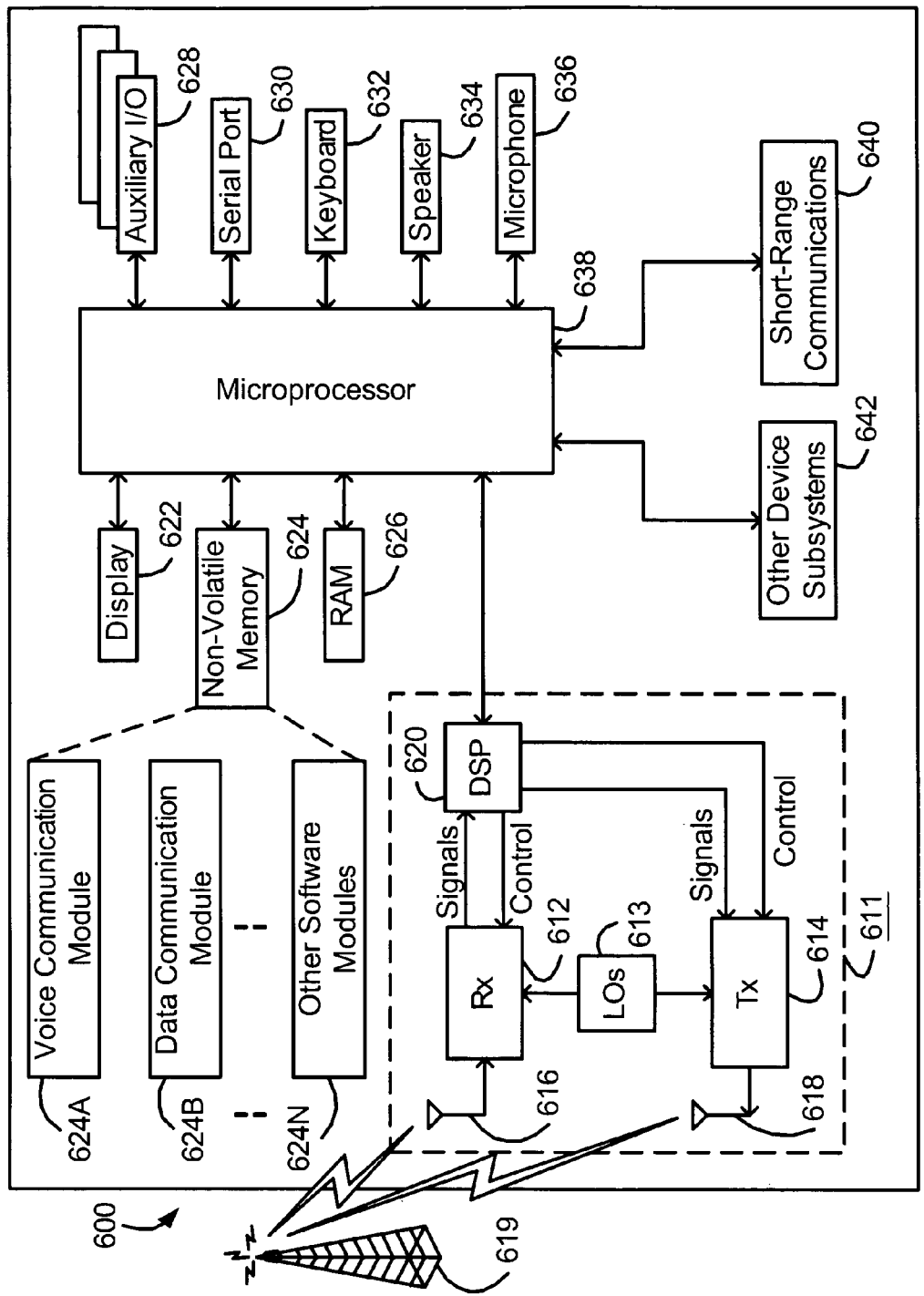
FIG. 5 is a block diagram of a wireless mobile communication device.

The methods and systems may be used with a wide assortment of electronic devices, such as a personal digital assistant (PDA) device or the mobile device 600 shown in FIG. 5. With reference to FIG. 5, the mobile device 600 is preferably a two-way communication device having at least voice and data communication capabilities. The mobile device 600 preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The mobile device 600 includes a transceiver 611, a microprocessor 638, a display 622, non-volatile memory 624, RAM 626, auxiliary input/output (I/O) devices 628, a serial port 630, a keyboard 632, a speaker 634, a microphone 636, a short-range wireless communications sub-system 640, and other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the non-volatile memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 5 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 5, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., will be dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 5 for both voice and data communications, the mobile device 600 may include two distinct transceivers, a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619.

The microprocessor 638 also interacts with other device subsystems, such as the display 622, non-volatile memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. The components 628, 632, 634 and 636 are examples of the types of subsystems that could be provided as UIs 62 (FIG. 3). The modules 624A-N are executed by the microprocessor 638 and may provide a high-level interface between a user of the mobile device and the mobile device. This interface typically includes a graphical component provided through the display 622, and an input/output component provided through the auxiliary I/O 628, keyboard 632, speaker 634, or microphone 636.

Some of the subsystems shown in FIG. 5 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. In addition to the operating system and communication modules 624A-N, the non-volatile memory 624 may also include a file system for storing data. A storage area is also preferably provided in the non-volatile memory 624 to store public keys, a private key, and other information required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the non-volatile store 624. As those skilled in the art will appreciate, the non-volatile store 624 may be implemented as a Flash memory component or a battery backed-up RAM, for example.

An exemplary application module 624N that may be loaded onto the mobile device 600 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The non-volatile memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to download other application modules 624N for installation, and to load Certs, keys and other information onto a device. This wired download path may be used to load an encryption key onto the mobile device 600, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

A short-range communications subsystem 640 is also included in the mobile device 600. For example, the subsystem 640 may include an infrared device and associated circuits and components, or a short-range wireless communication module such as a Bluetooth communication module or an 802.11 module to provide for communication with similarly-enabled systems and devices. Those skilled in the art will appreciate that "Bluetooth" and "802.11" refer to sets of specifications, available from the Institute of Electrical and Electronics Engineers (IEEE), relating to wireless personal area networks and wireless LANs, respectively.

It will be appreciated that the above description relates to preferred embodiments by way of example only. Many variations on the systems and methods described above will occur to those knowledgeable in the field, and such variations are within the scope of the invention as claimed, whether or not expressly described.

For example, although a wireless mobile communication device is shown in FIG. 5 and described as one possible system on which a messaging client may operate, public key access systems and methods may also be implemented in other messaging clients, including those configured for operation on desktop, laptop, or networked computer systems.

The invention claimed is:

1. A method for handling on a wireless mobile communication device a secure message to be sent from the wireless mobile communication device to a recipient, comprising the steps of:
   receiving data at the wireless mobile communication device about a security key associated with the recipient;
   using the received data to perform a validity check with respect to using the security key associated with the recipient to send a secure message to the recipient;
   wherein an issue exists due to the validity check;
   determining a reason for the validity check issue;
   wherein the reason for the validity check issue is provided via a user interface on the mobile device;
   wherein a message is provided via the user interface indicating that a problem exists with respect to sending the secure message to the recipient in addition to indicating the reason related to the problem.

2. The method of claim 1, further comprising the step of resolving the validity check issue associated with using the security key through use of the information provided in the validity check reason, wherein the secure message is sent after resolution of the validity check issue by the user.

3. The method of claim 1, wherein the security key is a public key, wherein a user composes the secure message, wherein the composed message is to be encrypted using the recipient's public key.

4. The method of claim 3, further comprising the steps of:
   creating a list of all recipients for the composed message;
   receiving data about the recipients' public keys that includes certificate information associated with the recipients; and
   performing the validity check with respect to the certificate information associated with the recipients.

5. The method of claim 1, further comprising the steps of:
   determining whether a certificate for an intended recipient can be located;

providing as a validity check reason that the intended recipient's certificate was not located.

6. The method of claim 5 further comprising the step of removing a recipient whose certificate was not located before sending a secure message to another recipient.

7. The method of claim 5 further comprising the step of canceling sending the message to a recipient whose certificate was not located.

8. The method of claim 5, further comprising the step of:
determining whether the certificate for the intended recipient is locally available on the mobile device.

9. The method of claim 5, further comprising the step of:
determining whether the certificate for the intended recipient is remotely available.

10. The method of claim 4, further comprising the step of collating certificates that correspond to the recipients before performing the validity check.

11. The method of claim 5, wherein the message is to be encrypted using a Secure Multipurpose Internet Mail Extensions (S/MIME) scheme or a Pretty Good Privacy (PGP) scheme.

12. The method of claim 1, wherein the received data about the security key associated with the recipient includes whether a recipient's certificate is permitted to be used;
wherein the validity check issue indicates that the recipient's certificate is not permitted to be used.

13. The method of claim 12, wherein the data about whether the recipient's certificate is permitted to be used is based on a usage field contained in the certificate.

14. The method of claim 12, wherein the data about whether the recipient's certificate is permitted to be used is based on a control file installed on the mobile device that specifies which certificates are allowed to be used.

15. The method of claim 1, wherein the issue involves a validity check failure, said method further comprising the step of providing the reason of the validity check failure to the user interface on the mobile device.

16. The method of claim 1, wherein the received data about the security key associated with the recipient includes strength of the recipient's certificate; and
wherein the validity check issue is directed to whether the recipient's certificate is permitted to be used based upon the strength of the recipient's certificate.

17. The method of claim 1, wherein the received data about the security key associated with the recipient includes whether the recipient's certificate is trusted, and wherein a decision to include a recipient for a secure message is based upon whether the recipient's certificate is trusted.

18. The method of claim 1, wherein the received data about the security key associated with the recipient includes validity and revocation status of a recipient's certificate, and wherein a decision to include the recipient for the secure message is based upon the validity and revocation status of the recipient's certificate.

19. The method of claim 1, wherein the message is sent to the recipient despite notification of the validity check issue.

20. The method of claim 1, wherein means for providing a wireless network and means for providing a message server are used to transmit the secure message from the mobile device.

21. The method of claim 1, wherein the mobile device is a handheld wireless mobile communications device or a personal digital assistant (PDA).

22. An apparatus for handling on an electronic device a secure message to be sent from the electronic device to a recipient, comprising:

a data processor;
a secure message processing module executing on the data processor for use with a messaging client that sends electronic messages to recipients;
wherein the secure message processing module receives data about a security key associated with the recipient;
wherein the secure message processing module uses the received data to perform a validity check with respect to using the security key associated with the recipient to send a secure message to the recipient;
wherein an issue exists based upon the validity check;
wherein the secure message processing module is configured to determine a reason for the validity check issue; and
wherein the secure message processing module provides the reason for the validity check issue via a user interface of the electronic device;
wherein a message is provided via the user interface indicating that a problem exists with respect to sending the secure message to the recipient in addition to indicating the reason related to the problem.

23. A computer-readable storage medium encoded with instructions that cause a processor to perform a method for handling on a wireless mobile communication device a secure message that is to be sent from the wireless mobile communication device to a recipient, said method comprising:
receiving data at the wireless mobile communication device about a security key associated with the recipient;
using the received data to perform a validity check with respect to using the security key associated with the message recipient to send a secure message to the recipient;
wherein an issue exists due to the validity check;
determining a reason for the validity check issue;
wherein the reason for the validity check issue is provided via a user interface on the mobile device;
wherein a message is provided via the user interface indicating that a problem exists with respect to sending the secure message to the recipient in addition to indicating the reason related to the problem.

24. A method for handling on a wireless mobile communication device a secure message to be sent from the wireless mobile communication device to a recipient, comprising the steps of:
receiving data at the wireless mobile communication device about a security key associated with the recipient;
using the received data to perform a validity check with respect to using the security key associated with the recipient to send a secure message to the recipient;
wherein an issue exists due to the validity check;
determining a reason for the validity check issue;
wherein the reason for the validity check issue is provided via a user interface on the mobile device; and
resolving the validity check issue associated with using the security key through use of the information provided in the validity check reason, wherein the secure message is sent after resolution of the validity check issue by the user.

25. The method of claim 24, wherein the security key is a public key, wherein a user composes the secure message, wherein the composed message is to be encrypted using the recipient's public key.

26. The method of claim 25, further comprising the steps of:
- creating a list of all recipients for the composed message;
- receiving data about the recipients' public keys that includes certificate information associated with the recipients; and
- performing the validity check with respect to the certificate information associated with the recipients.

27. The method of claim 24, further comprising the steps of determining whether a certificate for an intended recipient can be located;
providing as a validity check reason that the intended recipient's certificate was not located.

28. The method of claim 27 further comprising the step of removing a recipient whose certificate was not located before sending a secure message to another recipient.

29. The method of claim 27 further comprising the step of canceling sending the message to a recipient whose certificate was not located.

30. The method of claim 27, further comprising the step of: determining whether the certificate for the intended recipient is locally available on the mobile device.

31. The method of claim 27, further comprising the step of: determining whether the certificate for the intended recipient is remotely available.

32. The method of claim 26, further comprising the step of collating certificates that correspond to the recipients before performing the validity check.

33. The method of claim 27, wherein the message is to be encrypted using a Secure Multipurpose Internet Mail Extensions (S/MIME) scheme or a Pretty Good Privacy (PGP) scheme.

34. The method of claim 24, wherein the received data about the security key associated with the recipient includes whether a recipient's certificate is permitted to be used;
wherein the validity check issue indicates that the recipient's certificate is not permitted to be used.

35. The method of claim 34, wherein the data about whether the recipient's certificate is permitted to be used is based on a usage field contained in the certificate.

36. The method of claim 34, wherein the data about whether the recipient's certificate is permitted to be used is based on a control file installed on the mobile device that specifies which certificates are allowed to be used.

37. The method of claim 24, wherein the issue involves a validity check failure, said method further comprising the step of providing the reason of the validity check failure to the user interface on the mobile device.

38. The method of claim 24, wherein the received data about the security key associated with the recipient includes strength of the recipient's certificate; and
wherein the validity check issue is directed to whether the recipient's certificate is permitted to be used based upon the strength of the recipient's certificate.

39. The method of claim 24, wherein the received data about the security key associated with the recipient includes whether the recipient's certificate is trusted, and wherein a decision to include a recipient for a secure message is based upon whether the recipient's certificate is trusted.

40. The method of claim 24, wherein the received data about the security key associated with the recipient includes validity and revocation status of a recipient's certificate, and wherein a decision to include the recipient for the secure message is based upon the validity and revocation status of the recipient's certificate.

41. The method of claim 24, wherein the message is sent to the recipient despite notification of the validity check issue.

42. The method of claim 24, wherein means for providing a wireless network and means for providing a message server are used to transmit the secure message from the mobile device.

43. The method of claim 24, wherein the mobile device is a handheld wireless mobile communications device or a personal digital assistant (PDA).

44. An apparatus for handling on an electronic device a secure message to be sent from the electronic device to a recipient, comprising:
- a data processor;
- a secure message processing module executing on the data processor for use with a messaging client that sends electronic messages to recipients;
- wherein the secure message processing module receives data about a security key associated with the recipient;
- wherein the secure message processing module uses the received data to perform a validity check with respect to using the security key associated with the recipient to send a secure message to the recipient;
- wherein an issue exists based upon the validity check;
- wherein the secure message processing module is configured to determine a reason for the validity check issue; and
- wherein the secure message processing module provides the reason for the validity check issue via a user interface of the electronic device; and
- wherein the secure message processing module resolves the validity check issue associated with using the security key through use of the information provided in the validity check reason, wherein the secure message is sent after resolution of the validity check issue by the user.

45. A computer-readable storage medium encoded with instructions that cause a processor to perform a method for handling on a wireless mobile communication device a secure message that is to be sent from the wireless mobile communication device to a recipient, said method comprising:
- receiving data at the wireless mobile communication device about a security key associated with the recipient;
- using the received data to perform a validity check with respect to using the security key associated with the message recipient to send a secure message to the recipient;
- wherein an issue exists due to the validity check;
- determining a reason for the validity check issue;
- wherein the reason for the validity check issue is provided via a user interface on the mobile device; and
- resolving the validity check issue associated with using the security key through use of the information provided in the validity check reason, wherein the secure message is sent after resolution of the validity check issue by the user.

* * * * *